United States Patent
Ando et al.

(10) Patent No.: US 8,155,788 B2
(45) Date of Patent: Apr. 10, 2012

(54) AUTOMATIC MACHINE SYSTEM

(75) Inventors: Shingo Ando, Kitakyushu (JP);
Michiharu Tanaka, Kitakyushu (JP)

(73) Assignee: Kabushiki Kaisha Yaskawa Denki, Fukuoka (JP)

( * ) Notice: Subject to any disclaimer, the term of this patent is extended or adjusted under 35 U.S.C. 154(b) by 805 days.

(21) Appl. No.: 12/295,947

(22) PCT Filed: Mar. 13, 2007

(86) PCT No.: PCT/JP2007/054873
§ 371 (c)(1),
(2), (4) Date: Oct. 3, 2008

(87) PCT Pub. No.: WO2007/116624
PCT Pub. Date: Oct. 18, 2007

(65) Prior Publication Data
US 2010/0161123 A1   Jun. 24, 2010

(30) Foreign Application Priority Data
Apr. 10, 2006   (JP) ................................. 2006-107153

(51) Int. Cl.
*G05B 19/418*   (2006.01)
(52) U.S. Cl. ........................................... 700/248
(58) Field of Classification Search .................. 700/245, 700/247–248, 257, 260–261, 264; 318/568.11, 318/568.12, 568.13; 901/6, 50
See application file for complete search history.

(56) References Cited

U.S. PATENT DOCUMENTS

| | | | |
|---|---|---|---|
| 4,998,050 A * | 3/1991 | Nishiyama et al. | 700/248 |
| 5,371,836 A * | 12/1994 | Mitomi et al. | 700/245 |
| 7,069,112 B2 * | 6/2006 | Graf | 700/248 |
| 2004/0148058 A1 * | 7/2004 | Johannessen et al. | 700/245 |
| 2004/0167668 A1 * | 8/2004 | Wang et al. | 700/248 |
| 2004/0260426 A1 * | 12/2004 | Johannessen et al. | 700/245 |
| 2005/0091684 A1 * | 4/2005 | Kawabata et al. | 725/35 |

FOREIGN PATENT DOCUMENTS

| | | | |
|---|---|---|---|
| JP | 60-186908 A | | 9/1985 |
| JP | 61-161518 A | | 7/1986 |
| JP | 5-127734 A | | 5/1993 |
| JP | 5-173627 A | | 7/1993 |
| JP | 5-276117 A | | 10/1993 |
| JP | 2001-244084 A | | 9/2001 |
| JP | 2001244084 A | * | 9/2001 |
| JP | 2003-200371 A | | 7/2003 |
| JP | 2003200371 A | * | 7/2003 |

* cited by examiner

*Primary Examiner* — Khoi Tran
*Assistant Examiner* — Harry Oh
(74) *Attorney, Agent, or Firm* — Sughrue Mion, PLLC

(57) ABSTRACT

To provide an automatic machine system for readily and reliably selecting a desired mechanism part from among the automatic machine systems composed of a plurality of mechanism parts and teaching the mechanism part.

Each of a plurality of mechanism parts such as robots includes a first communication part. A teaching operation part includes a second communication part with directivity. When the second communication part of the teaching operation part is oriented to the first communication part included in a target mechanism part to select the same, the second communication part transmits selection request information to the first communication part. A controller for controlling the mechanism parts places the target mechanism part in an operable state based on the selection request information thereby operating the target mechanism part with the operation of the worker on the teaching operation part.

10 Claims, 6 Drawing Sheets

AUTOMATIC MACHINE SYSTEM

TECHNICAL FIELD

The present invention relates to an automatic machine system for performing drive control of a plurality of mechanism parts by way of a single controller and in particular to selection of a mechanism part whose operation is to be instructed by using a teaching device connected to a controller.

BACKGROUND ART

As an example of an automatic machine system such as a production facility or a production line to which a mechanism part including a motor drive shaft is applied, there is a system for performing work such as welding or cutting by applying an industrial robot. There is also a scaled-up robot system with the scale of its production facility varying with the shape or size of a workpiece and including a plurality of robots, a travel mechanism for mounting a robot and traveling or a workpiece moving mechanism for rotating and tilting a workpiece, where a plurality of mechanism parts are coordinated with each other to perform work. To eliminate waste in coordinated operation between mechanism parts, the operations of these mechanism parts are controlled by a single controller.

A robot system includes a control part (controller) for controlling the operation of a mechanism part such as the robot and a portable teaching operation part (also called a pendant) carried along by a worker for example in the teaching work for registering and changing a work procedure as a work program.

The teaching operation part is used also for teaching a plurality of robots or other mechanism parts to teach various work programs of individual robots and mechanism parts before the system starts running. For this purpose, a desired mechanism part is specified from among a plurality of mechanism parts such as robots prior to teaching work.

An exemplary block diagram of a related art robot system is shown in FIG. 5. In FIG. 5, a numeral 101 represents a first robot, 102 a second robot, 103 a controller for controlling the operation of the robots 101 and 102, 104 a portable teaching operation part, 105 a complex cable for transmitting information such as a push on an operation button or an emergency shutdown between the controller 103 and the teaching operation part 104 or supplying power.

A detail plan of the teaching operation part 104 is shown in FIG. 6. In FIG. 6, a numeral 104a represents an almost T-shaped enclosure and 104b a hand part grasped by the worker. On the operation surface of the enclosure 104a are arranged a keyboard (or keysheet) 104c operated in teaching, an LCD display 104d for displaying various information such as teaching data and robot position, and an emergency shutdown switch 104e (corresponding to emergency shutdown means). To the enclosure 104a is connected one end of the cable 105.

The worker wishing to operate the first robot 101 must previously select the first robot 101 in the operation on the teaching operation part 104. When the worker presses the direction key of each robot axis on the keyboard 104c, axis operation information is transmitted to the controller 103 via the cable 105. The controller 103 outputs a drive current to a drive axis motor (not shown) of the first robot 101 to operate the first robot 101. The direction key refers to a key used to instruct the operation direction of a motor, direction in the Cartesian coordinates or operation direction of a robot wrist in the teaching work or the like.

Similarly, when the worker presses the emergency shutdown switch 104e, emergency shutdown information is transmitted to the controller 103 via the cable 105. The controller 103 shuts down power to the drive motor (not shown) for the robots 101, 102 and applies a brake (not shown) to each drive axis motor to forcibly stop the operation of the robots 101, 102. This reliably brings a robot in emergency shutdown upon possible unintended operation.

When performing teaching work concerning registration and change of a work program using the first robot 101, the worker performs programming of the work program and position registration of the first robot 101 via operation on the teaching operation part 104. For the position registration of the robot, the first robot 101 is moved to a desired position by way of a push on the direction key of each robot axis on the teaching operation part 104 and the position of the robot 101 is registered via registration operation on the keyboard 104c. To change the registered position, the first robot 101 is moved to a desired position by the same operation and the new position is registered via position change operation.

As an exemplary technique to select a desired mechanism part (robot), Patent Reference 1 discloses a controller which selects, in the procedure for manually operating a single robot alone among a plurality of robots connected to a single controller, a robot to be instructed to operate with the operation of a target device selector switch on a teaching pendant (teaching operation part) connected to the controller and which checks the correspondence between a number selected and the actual robot selected in accordance with the state of an indicator lamp arranged on the robot or close to the robot.

Patent Reference 2, similar to Patent Reference 1, discloses that a ten-key pad or the like functions as a selector switch for specifying a particular manipulator (robot) from among a large number of manipulators (robots).

Patent Reference 1: JP-A-05-173627 (refer to line 37 and thereafter, Section 4 and line 44 and thereafter, Section 5)
Patent Reference 2: JP-A-05-127734 (refer to line 21 and thereafter, Section 3)

DISCLOSURE OF THE INVENTION

Problems to be Solved by the Invention

In the related art examples, a target device (corresponding to a mechanism part) is selected by toggling the target device selector switch in Patent Reference 1 and by using a ten-key pad or the like in Patent Reference 2. In this way, selection is made via operation on the teaching operation part based on the intention of the worker. The worker must associate the operation on the teaching operation part and the indication to the actual target device in selection of a target device with the operation on the teaching operation part. As the number of devices increases from which one is selected, a selection error could occur due to a mistake of the worker in the association procedure or misoperation on the teaching operation part. While checkup of selection of an appropriate target device through selection procedure effectively prevents a selection error to some degree, fatigue from prolonged work or immunity of the worker to a possible mistake could ignore the checkup process.

An error in the selection of a target device leads to operation of a device not intended by the worker upon issuance of an operating instruction, possibly resulting in interference or collision between the device or a jig around the device and a product. This could damage or break the device, the jig around the device or the product, which could bring about serious losses. In case a desired robot is searched for while the selector switch is sequentially toggled in the selection of a device, any one of the devices is ready to operate so that the possibility is higher that a device is operated by mistake. In any case, an unintended device could operate thus causing interference or collision between the device or a jig around the device and a product, which could damage or break the device, the jig around the device or the product thereby inviting serious losses. When positioned near the device, the worker is exposed to danger due to operation of the device.

The invention has been accomplished in view of the above problems. An object of the invention is to provide an automatic machine system for reliably selecting a desired automatic machine from among a plurality of automatic machines connected to a single controller and teaching the selected automatic machine.

Means for Solving the Problems

To solve the problems, the invention is structured as follows:

According to claim 1, there is provided an automatic machine system including:

a plurality of mechanism parts;

a controller connected to the plurality of mechanism parts and controlling operation of the plurality of mechanism parts;

a teaching operation part connected to the controller and selecting a particular mechanism part from among the plurality of mechanism parts, placing the mechanism part in an operable state and teaching the mechanism part to perform specific work;

each of the plurality of mechanism parts including a first communication part;

the teaching operation part including a second communication part and mechanism selection input member; wherein when the second communication part of the teaching operation part is oriented to the first communication part included in the particular mechanism part and operation input is made to the mechanism selection input member, communications start between the second communication part and the first communication part and the controller selects the particular mechanism part to place the mechanism part in an operable state.

According to claim 2, there is provided an automatic machine system including:

a plurality of mechanism parts including a first mechanism part and a second mechanism part;

a controller connected to the plurality of mechanism parts and controlling operation of the plurality of mechanism parts; and a teaching operation part connected to the controller and selecting a particular mechanism part from among the plurality of mechanism parts, placing the mechanism part in an operable state and teaching the mechanism part to perform specific work;

each of the plurality of mechanism parts including a first communication part;

the teaching operation part including a second communication part, master mechanism selection input member and slave mechanism selection input member; wherein when the second communication part of the teaching operation part is oriented to the first communication part included in the first mechanism part and operation input is made to the master mechanism selection input member, communications start between the second communication part and the first communication part included in the first mechanism part, and the first mechanism part is selected and placed in an operable state, and when the second communication part of the teaching operation part is oriented to the first communication part included in the second mechanism part and operation input is made to the slave mechanism selection input member, communications start between the second communication part and the first communication part included in the second mechanism part, and the second mechanism part is selected, and the controller assumes the first mechanism part as a master mechanism part and the second mechanism part as a slave mechanism part, and enables a coordinated operation ready state in which the slave mechanism part operates on the basis of the operation of the master mechanism part.

According to claim 3, there is provided the automatic machine system, wherein the controller has an inherent information in advance, the teaching operation part includes a storage part for acquiring from the storage controller and storing the inherent information, and the teaching operation part transmits, from the second communication part, selection request information including the inherent information stored in the storage part, on the basis of operation input to the mechanism selection input member or the master mechanism selection input member or the slave mechanism selection input member.

According to claim 4, there is provided the automatic machine system, wherein the controller includes:

a selection drive part for selecting and driving the plurality of mechanism parts on the basis of a selection signal, and a collation part for inputting an output from the first communication part included in each of the plurality of mechanism parts and the inherent information, the collation part collating inherent information included in the selection request information received by the first communication part with the inherent information, and outputting a selection signal for selecting the mechanism part including the first communication part that has received the selection request information to the selection drive part to place the selected mechanism part in an operable state, when a match is obtained in the collation result.

According to claim 5, there is provided the automatic machine system, wherein on simultaneously receiving the identical selection request information by the plurality of first communication parts, the collation part enables the selection request information received by the first communication part having the maximum receiving strength, and disables the selection request information received by the other first communication parts.

According to claim 6, there is provided the automatic machine system, wherein the first communication part and the second communication part perform directive optical communications.

According to claim 7, there is provided the automatic machine system, wherein the mechanism part is a robot, a robot travel mechanism or a workpiece operation mechanism, the controller is a robot controller, and the teaching operation part is a portable teaching operation device.

Advantage of the Invention

With the invention according to claims 1 through 10, each of a teaching operation part and a mechanism part (robot) includes a directive communication part. By utilizing the directivity of the communication parts and information communicated, a teaching worker may orient a teaching operation part in the direction of a mechanism part desired by the teaching worker and press a single switch to specify a target mechanism part (robot) in a simple and reliable fashion, thus preventing a selection error caused by misoperation of the mechanism part.

Figure 1:
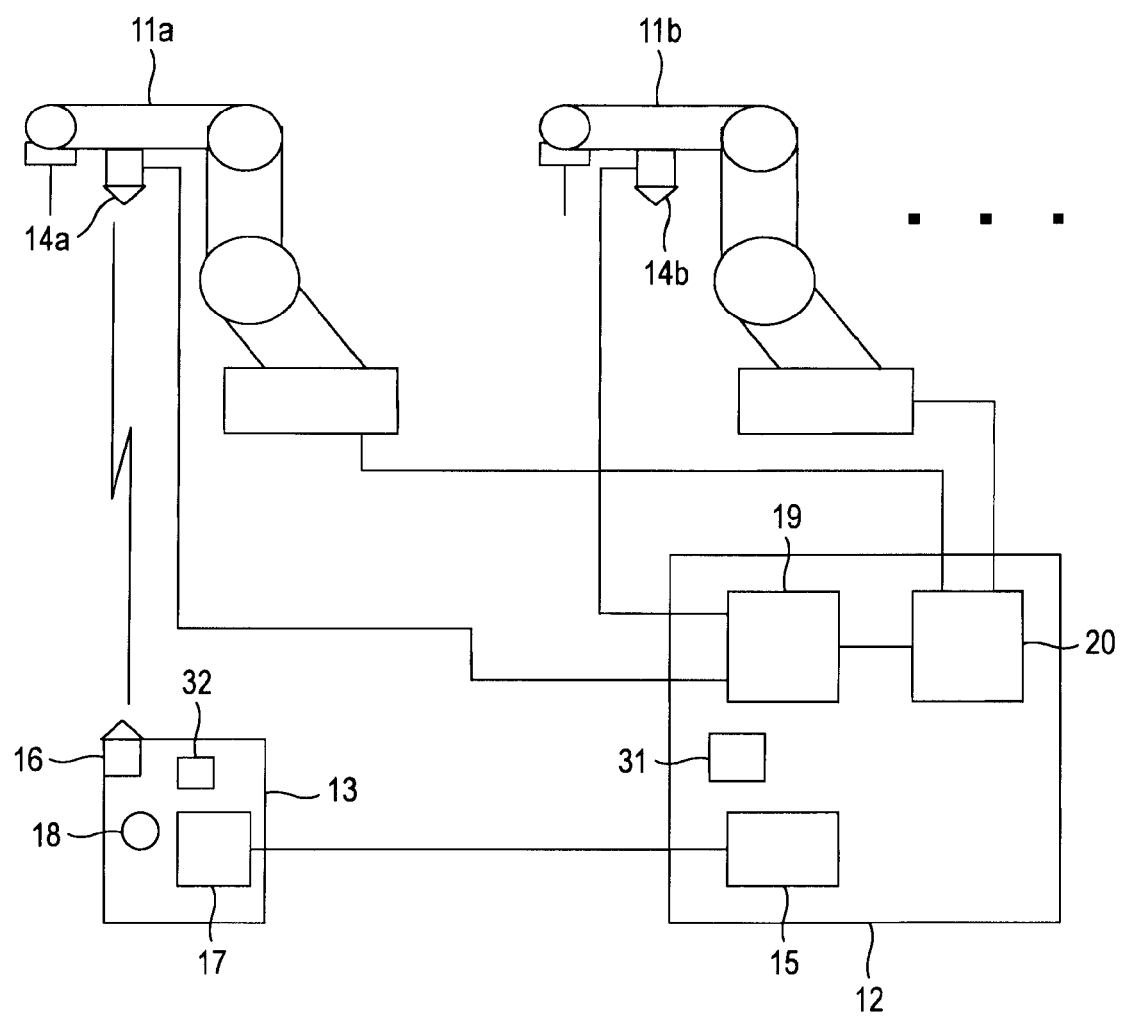
FIG. 1 is a block diagram of a robot system according to Embodiment 1 of the invention.

DESCRIPTION OF REFERENCE NUMERALS AND SIGNS 11a, 11b, 101, 102: Robot
12, 103: Controller
13, 104: Teaching operation part
14a, 14b: First communication part
15: Operation communication part
16: Second communication part
17: Controller communication part
18: Selection input switch
19: Collation part
20: Selection drive part
21: Coordinated operation selection input member
31: Setting unit
32: Storage part
104a: Enclosure
104b: Hand part
104c: Keyboard
104d: LCD display
104e: Emergency shutdown switch
105: Cable

BEST MODE FOR CARRYING OUT THE INVENTION

Specific embodiments of the invention will be described below with reference to drawings.

Embodiment 1

FIG. 1 is a block diagram of an automatic machine (robot in this example) system according to Embodiment 1 of the invention. In FIG. 1, a numeral 11a, 11b represents a robot, 12 a controller for performing drive control of the plurality of robots 11a, 11b, and 13 a portable teaching operation part.

The robots 11a, 11b respectively include first communication parts 14a, 14b connected to the collation part 19 of the controller 12. The robots 11a, 11b are connected to the selection drive part 20.

The controller 12 includes an operation communication part 15 for performing communications with the teaching operation part, a collation part 19 connected to the first directive communication parts 14a, 14b respectively included in the robots 11a, 11b, and a selection drive part 20 for selectively driving a robot based on a selection signal from the collation part 19. The controller includes a setting unit 31 to which predetermined inherent information such as a serial number is set. The inherent information is outputted to the collation part 19.

The teaching operation part 13 includes a second communication part 16, a controller communication part 17 for performing communications with the operation communication part 15 of the controller, a selection input switch 18, and a storage part 32 for storing inherent information.

Next, teaching operation of the robot 11a will be described starting with a preparatory stage where inherent information is shared by the controller 12 and the teaching operation part 13.

When the control power source of the automatic machine system is inputted, power is supplied from the controller 12 to the teaching operation part 13 via a cable. The controller 12 and the teaching operation part 13 perform self diagnosis of a control part and its peripheral circuit (not shown) included therein. With appropriate timing, the operation communication part 15 and the controller communication part communicate with each other and store the inherent information set to the setting unit 31 into the storage part 32.

In case the storage part 32 is a non-volatile storage device backed up by a battery, it is not necessary to transmit inherent information each time the control power is inputted.

Next, the worker specifies the robot 11a to be operated and orients the transmission direction of the second communication part 16 of the teaching operation part 13 in the direction of the first communication part 14a provided on the robot 11a and presses the selection input switch 18 to place the robot 11a in an operable state.

Figure 2:
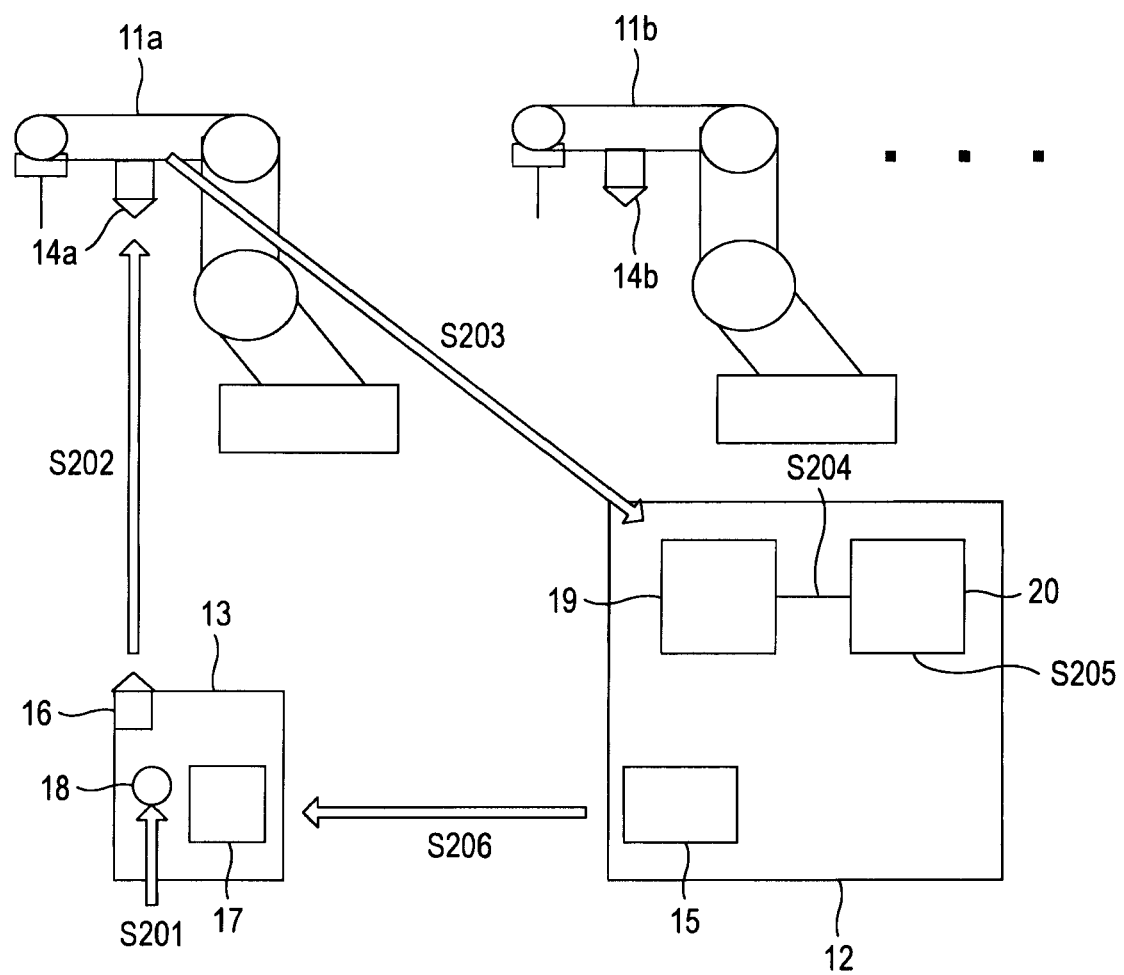
FIG. 2 is an operation drawing of communication connection according to Embodiment 1 of the invention.

FIG. 2 is a schematic diagram of the operation of robot selection (direction and order of information transmission). The flow of the operation of robot selection will be described referring to FIG. 2. Note that the same sign as that in FIG. 1 represents the same or equivalent component and the corresponding description is omitted.

The worker orients the second communication part 16 of the teaching operation part 13 to the first communication part 14a and presses the selection input switch 18 (S201).

The second communication part 16 transmits to the first communication part 14a selection request information including the inherent information of the controller 12 acquired in the preparatory stage (S202).

On receiving the selection request information, the first communication part 14a outputs the information to the collation part 19 of the controller 12 (S203).

The collation part 19 inputs the selection request information and collates the inherent information included therein with the inherent information set to the setting unit 31. When both information items match with each other, the collation part 19 outputs a selection signal to the selection drive part 20 (S204). The selection signal is used by the collation part 19 to select the robot 11a including the first communication part 14a to which the collation part 19 inputs the selection request information.

The selection drive part 20 places the robot 11a in an operable state. The worker transmits axis operation information to the controller 12 with the operation on the keyboard included in the teaching operation part 13 to cause the robot 11a to operate (S205).

When outputting a selection signal, the collation part 19 transmits information corresponding to the selection signal to the teaching operation part 13 (S206). The teaching operation part 13 displays information corresponding to the selection signal on a display unit such as an LCD display included in the teaching operation part 13. The worker may check whether the robot selection process is appropriately complete, thus eliminating the possibility of misoperation and assuring reliable operation.

The selection may be made to a robot as well as to an external drive mechanism such as the travel axis of a robot and rotation and tilting axes of a workbench.

As described above, with the invention, it is possible to appropriately specify a desired robot from among a plurality of robots by adding a directive communication part to each of the teaching operation part and the robot main body, thereby operating the specified robot alone.

Embodiment 2

Figure 3:
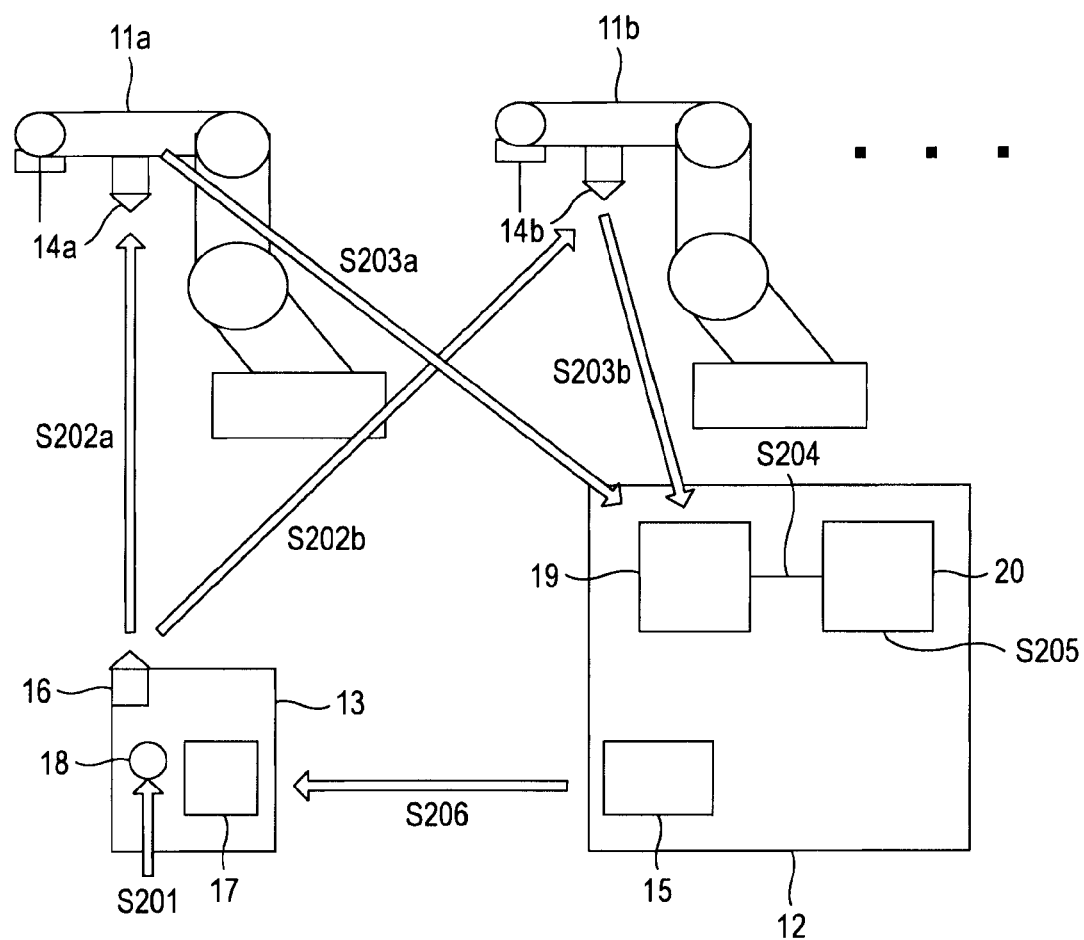
FIG. 3 is an operation drawing of communication connection according to Embodiment 2 of the invention.

FIG. 3 is a schematic diagram of the operation of robot selection (direction and order of information transmission) according to Embodiment 2 of the invention. The flow of the operation of robot selection will be described referring to FIG. 3. Note that the same sign as that in FIG. 1 or 2 represents the same or equivalent component and the corresponding description is omitted.

This embodiment relates to a robot selection scenario where the first communication parts 14a, 14b included in the robots 11a, 11b are aligned almost linearly when selection request information is transmitted from the second communication part 16 of the teaching operation device 13 (the first communication parts 14a, 14b are not aligned linearly in FIG. 3).

In S201, same as Embodiment 1, the worker orients the second communication part 16 of the teaching operation part 13 to the first communication part 14a and presses the selection input switch 18.

In the next step, the second communication part 16 transmits to the first communication part 14a selection request information including the inherent information of the controller 12 acquired in the preparatory stage. The first communication parts 14a, 14b included in the robots 11a, 11b are aligned almost linearly so that both of the first communication parts 14a and 14b can receive selection request information. In FIG. 3, the selection request information is transmitted to the first communication parts 14a and 14b in steps S202a and S202b respectively.

On receiving the selection request information, the first communication parts 14a and 14b output the information to the collation part 19 of the controller 12. In FIG. 3, the selection request information S203a or S203b is outputted from the first communication part 14a or 14b. The selection request information is simultaneously received by the first communication parts 14a and 14b so that the outputs S203a and S203b to the collation part 19 occur simultaneously.

The collation part 19 inputs the selection request information S203a and S203b with different receiving strength depending on the distance between the first communication part 14a or 14b and the second communication part 16 provided when the first communication part 14a or 14b receives selection request information. Assume that the receiving strength is greater at the first communication part 14a than at the first communication part 14b. The collation part 19 inputs the selection request information S203a and S203b together with the receiving strength and enables the selection request information S203a with greater receiving strength or a greater corresponding signal or information, and disables the remaining selection request information S203b. The collation part 19 then collates the inherent information included in the enabled selection request information S203a with the inherent information set to the setting unit 31. When both information items match with each other, the collation part 19 outputs a selection signal to the selection drive part 20 (S204). The robot 11a is selected and placed in an operable state as in S205.

In this way, a robot to be placed in an operable state is selected based on the receiving strength of selection request information, thereby dramatically relaxing the restriction of the position of the teaching operation part 13 assumed when a robot is arranged or selected in a production facility or on a production line.

Embodiment 3

Embodiment 3 relates to a method for selecting a robot assumed in case a plurality of robots are taught by the teaching operation part.

Figure 4:
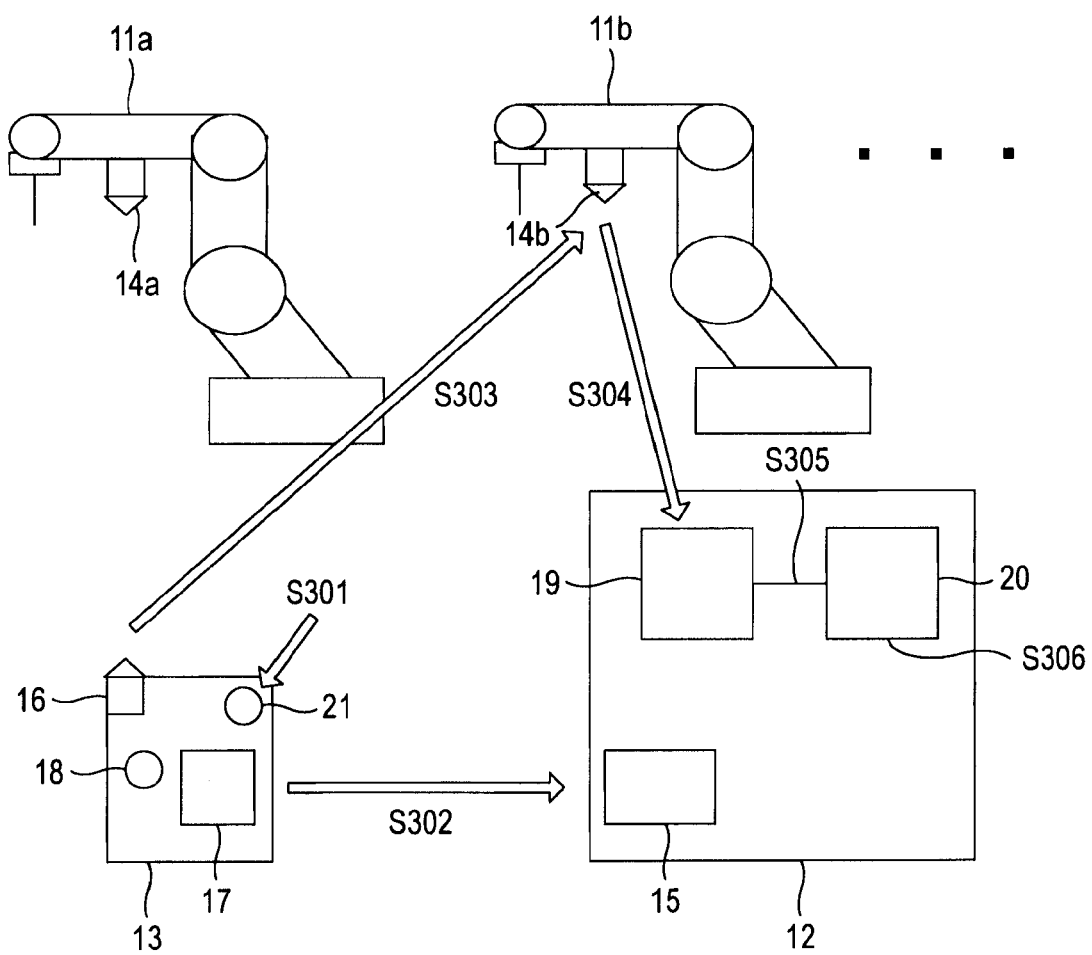
FIG. 4 It is an operation drawing of communication connection according to Embodiment 3 of the invention.
Figure 5:
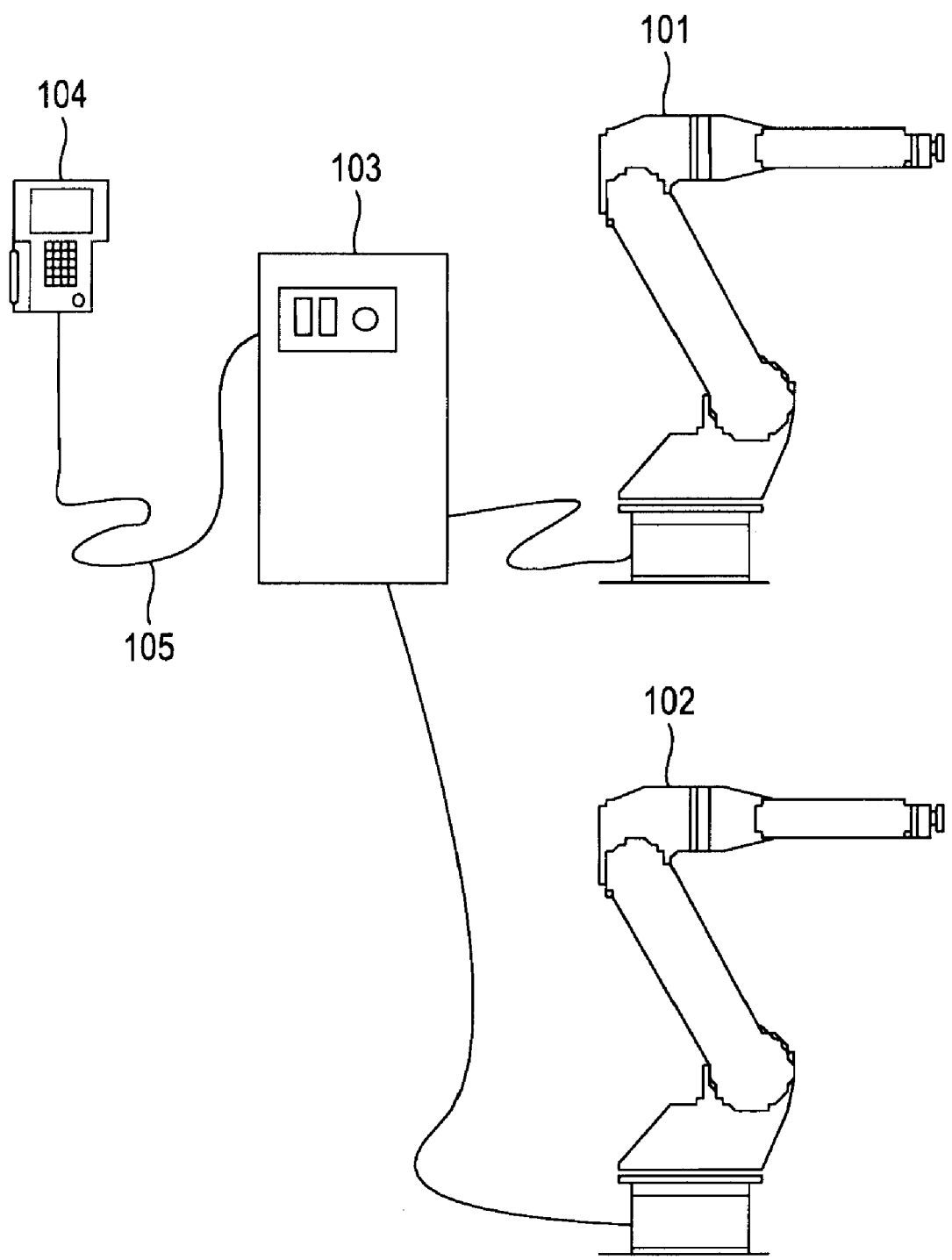
FIG. 5 is a block diagram of a robot system according to the related art.
Figure 6:
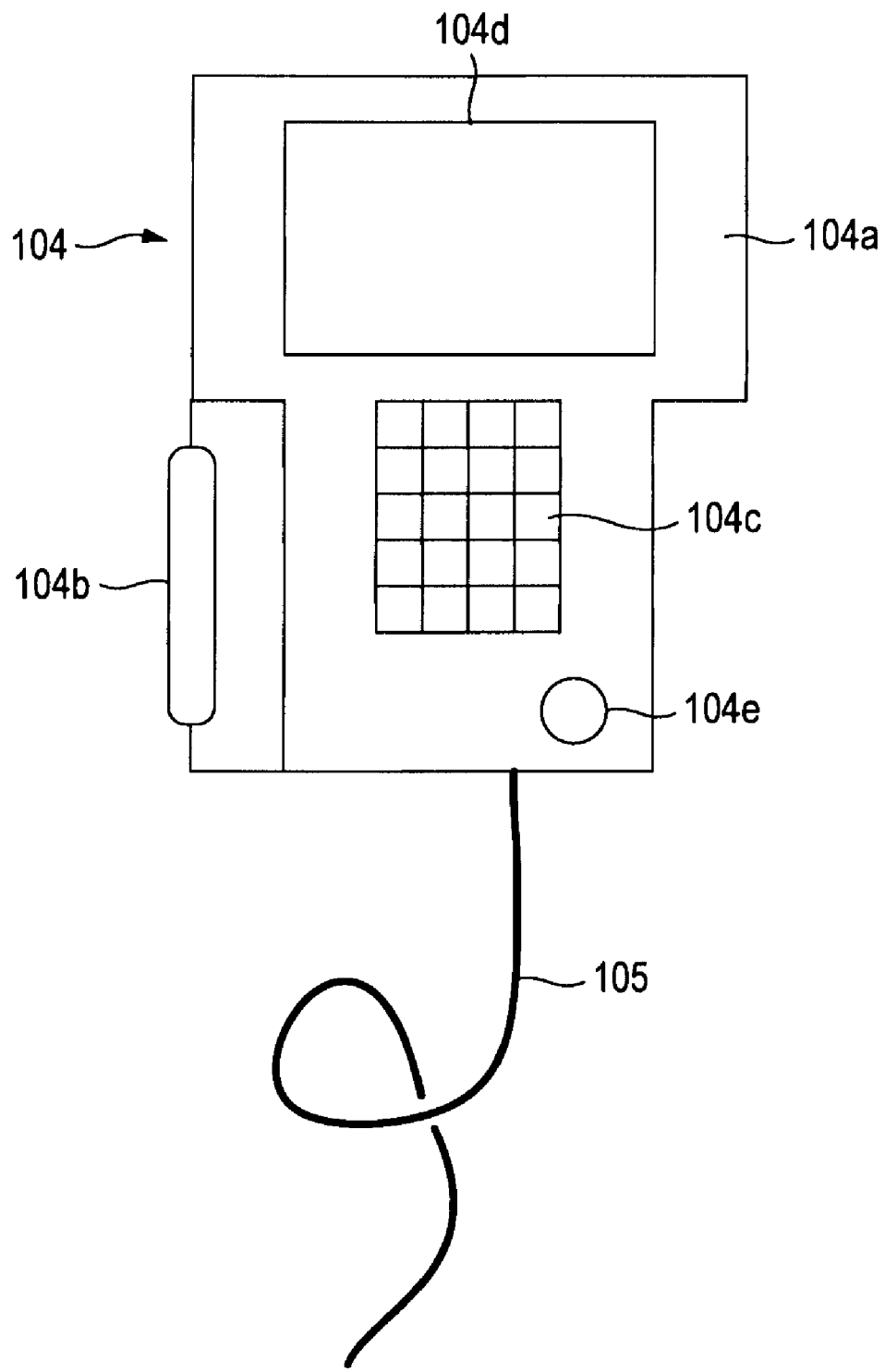
FIG. 6 is a detail plan of a teaching operation part according to the related art.

FIG. 4 is a schematic diagram of the operation of robot selection (direction and order of information transmission) according to Embodiment 3. The flow of robot selection will be described referring to FIG. 4. Note that the same sign as that in FIG. 1 represents the same or equivalent component and the corresponding description is omitted.

An exemplary case will be described where two robots 11a and 11b shown in FIG. 4 are operated in a coordinated fashion.

Note that the teaching operation part 13 in FIG. 4 includes a target device selection switch 18 as master mechanism selection input member and a coordinated device selection switch 21 as slave mechanism selection input member.

The operation of selecting a master mechanism part, for example the robot 11a is the same as that in Embodiment 1 or Embodiment 2. The worker specifies the robot 11a to be operated and orients the transmission direction of the second communication part 16 of the teaching operation part 13 in the direction of the first communication part 14a provided on the robot 11a and presses the selection input switch 18 to place the robot 11a in an operable state.

Next, operation of selecting the robot 11b as a slave mechanism part will be described.

The worker orients the second communication part 16 of the teaching operation part 13 to the first communication part 14b and presses the coordinated device selection switch 21 (S301).

The worker notifies the control 12 that selection of a coordinated device is to take place (S302).

The second communication part 16 transmits to the first communication part 14b selection request information including the inherent information of the controller 12 acquired in the preparatory stage (S303).

On receiving the selection request information, the first communication part 14b outputs the information to the collation part 19 of the controller 12 (S304).

The collation part 19 inputs the selection request information and collates the inherent information included therein with the inherent information set to the setting unit 31. When both information items match with each other, the collation part 19 outputs a selection signal to the selection drive part 20 (S305). The selection signal is used by the collation part 19 to select the robot 11b including the first communication part 14b to which the collation part 19 inputs the selection request information. At this time, the robot 11a is already selected as a master mechanism part and selection of a slave mechanism part is noticed in step S302. Thus, respective selection signals of the robot 11a as a master mechanism part and the robot 11b as a slave mechanism part are outputted.

The selection drive part 20 places the robots 11a and 11b in an operable state for coordinated work (S306). The worker transmits axis operation information to the controller 12 with the operation on the keyboard included in the teaching operation part 13 to cause the robot 11*a* to operate and the robot 11*b* to operate in a coordinated fashion in accordance with the operation of the robot 11*a*.

As described above, mechanism selection is made on two robots from the teaching operation part 13 thus placing the robot 11*a* as a master and the robot 11*b* as a slave in a coordinated operation ready state while keeping both robots in the relative relationship.

It will be understood that a push on a master/slave selector means on the teaching operation part reverses the master/slave relationship between the robots 11*a* and 11*b* or use of deselection means cancels the selection in the mechanism part, thereby flexibly selecting a target mechanism part via operation on the teaching operation part 13.

As described above, with the invention, it is possible to appropriately and readily specify a combination of robots to be operated in a coordinated fashion from among a plurality of robots by adding a directive communication part to each of the teaching operation part and the robot main body, thereby operating the specified robot pair alone in a coordinated fashion.

INDUSTRIAL APPLICABILITY

The invention allows reliable selection of a robot the worker wishes to operate from among a plurality of robots connected to a controller on the teaching operation part of an industrial robot whose applications include welding, coating and assembly, thus preventing an accident attributable to misoperation.

The invention claimed is:

1. An automatic machine system comprising:
a plurality of mechanism parts, each of the mechanism parts including a first communication part;
one controller connected to the mechanism parts and configured to control operation of the mechanism parts, the controller having an identification information which is previously provided;
a teaching operation part connected to the controller and configured to select a particular mechanism part from among the mechanism parts to be placed into an operable state and to teach the particular mechanism part to perform specific work,
the teaching operation part including
a second communication part wirelessly communicable with the first communication parts,
a mechanism selection input member configured to cause the second communication part to transmit selection request information by being operated and
a storage part configured to store the identification information obtained from the controller,
wherein when the mechanism selection input member is operated in a state where the second communication part is oriented to the first communication part of the particular mechanism part,
the second communication part transmits the selection request information including the identification information to the first communication part,
the first communication part forwards the received selection request information to the controller, and
the controller places the particular mechanism part into the operable state when the newly-received identification is identical with the previously-provided identification information.

2. An automatic machine system comprising:
a plurality of mechanism parts including a first mechanism part and a second mechanism part, each of the mechanism parts including a first communication part;
one controller connected to the mechanism parts and configured to control operation of the mechanism parts, the controller having an identification information which is previously provided; and
a teaching operation part connected to the controller and configured to select a particular mechanism part from among the mechanism parts to be placed into an operable state and to teach the particularly mechanism part to perform specific work;
the teaching operation part including
a second communication part wirelessly communicable with the first communication parts,
a master mechanism selection input member configured to cause the second communication part to transmit first selection request information by being operated,
a slave mechanism selection input member configured to cause the second communication part to transmit second selection request information by being operated, and
a storage part configured to store the identification information obtained from the controller,
wherein when the master mechanism selection input member is operated in a state where the second communication part is oriented to the first communication part of the first mechanism part,
the second communication part transmits the first selection request information including the identification information to the first communication part of the first mechanism part,
the first communication part forwards the received first selection request information to the controller, and
the controller places the first mechanism part into the operable state when the newly-received identification information is identical with the previously-provided identification information, and
when the slave mechanism selection input member is further operated in an state where the second communication part is oriented to the first communication part of the second mechanism part,
the second communication part transmits the second selection request information including the identification information to the first communication part of the second mechanism part,
the first communication part forwards the received first selection request information to the controller, and
the controller places the second mechanism part into the operative state so that the second mechanism part operates as a slave mechanism part on the basis of the operation of the first mechanism part as a master mechanism part.

3. The automatic machine system according to claim 1, wherein
the controller has an inherent information in advance,
the teaching operation part includes a storage part for acquiring from the storage controller and storing the inherent information, and
the teaching operation part transmits, from the second communication part, selection request information including the inherent information stored in the storage part, on the basis of operation input to the mechanism selection input member or the master mechanism selection input member or the slave mechanism selection input member.

4. The automatic machine system according to claim 1, wherein
the controller includes:
a selection drive part for selecting and driving the plurality of mechanism parts on the basis of a selection signal, and
a collation part for inputting an output from the first communication part included in each of the plurality of mechanism parts and the inherent information,
the collation part collating inherent information included in the selection request information received by the first communication part with the inherent information, and outputting a selection signal for selecting the mechanism part including the first communication part that has received the selection request information to the selection drive part to place the selected mechanism part in an operable state, when a match is obtained in the collation result.

5. The automatic machine system according to claim 4, wherein
on simultaneously receiving the identical selection request information by the plurality of first communication parts, the collation part enables the selection request information received by the first communication part having the maximum receiving strength, and disables the selection request information received by the other first communication parts.

6. The automatic machine system according to claim 1, wherein
the mechanism part is a robot, a robot travel mechanism or a workpiece operation mechanism,
the controller is a robot controller, and
the teaching operation part is a portable teaching operation device.

7. The automatic machine system according to claim 2, wherein
the controller has an inherent information in advance,
the teaching operation part includes a storage part for acquiring from the storage controller and storing the inherent information, and
the teaching operation part transmits, from the second communication part, selection request information including the inherent information stored in the storage part, on the basis of operation input to the mechanism selection input member or the master mechanism selection input member or the slave mechanism selection input member.

8. The automatic machine system according to claim 2, wherein
the controller includes:
a selection drive part for selecting and driving the plurality of mechanism parts on the basis of a selection signal, and
a collation part for inputting an output from the first communication part included in each of the plurality of mechanism parts and the inherent information,
the collation part collating inherent information included in the selection request information received by the first communication part with the inherent information, and outputting a selection signal for selecting the mechanism part including the first communication part that has received the selection request information to the selection drive part to place the selected mechanism part in an operable state, when a match is obtained in the collation result.

9. The automatic machine system according to claim 8, wherein
on simultaneously receiving the identical selection request information by the plurality of first communication parts, the collation part enables the selection request information received by the first communication part having the maximum receiving strength, and disables the selection request information received by the other first communication parts.

10. The automatic machine system according to claim 2, wherein
the mechanism part is a robot, a robot travel mechanism or a workpiece operation mechanism,
the controller is a robot controller, and
the teaching operation part is a portable teaching operation device.

* * * * *